(12) United States Patent
Leichsenring et al.

(10) Patent No.: US 11,519,486 B2
(45) Date of Patent: Dec. 6, 2022

(54) HYDRODYNAMIC TORQUE CONVERTER WITH A LOCK-UP CLUTCH

(71) Applicant: ZF Friedrichshafen AG, Friedrichshafen (DE)

(72) Inventors: Horst Leichsenring, Friedrichshafen (DE); Ewgeni Bayer, Sipplingen (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 17/493,235

(22) Filed: Oct. 4, 2021

(65) Prior Publication Data

US 2022/0107012 A1   Apr. 7, 2022

(30) Foreign Application Priority Data

Oct. 5, 2020 (DE) ...................... 10 2020 212 524.4

(51) Int. Cl.
 *F16H 45/02* (2006.01)
(52) U.S. Cl.
 CPC .................................... *F16H 45/02* (2013.01)
(58) Field of Classification Search
 CPC .................................... F16H 45/02–2045/0294
 See application file for complete search history.

(56) References Cited

U.S. PATENT DOCUMENTS 4,128,999 A * 12/1978 Yokoyama .............. F16H 45/02
  60/353
4,181,203 A *  1/1980 Malloy ................... F16H 61/14
  192/3.3

2005/0211523 A1 *  9/2005 Takahashi ............... F16H 45/02
  192/3.29
2008/0308374 A1   12/2008 Heukelbach et al.
2021/0010578 A1 *  1/2021 de Lima Zocca ...... F16H 41/28

FOREIGN PATENT DOCUMENTS

| DE | 35 43 013 A1 | 6/1987 | |
|---|---|---|---|
| DE | 195 27 853 C1 | 12/1996 | |
| DE | 10 2005 051 739 A1 | 5/2007 | |
| DE | 10 2007 061 949 A1 | 6/2009 | |
| DE | 10 2007 061 950 A1 | 6/2009 | |
| DE | 102009023591 A1 * | 12/2009 | ............. F16H 45/02 |

OTHER PUBLICATIONS

German Search Report Corresponding to 10 2020 212 524.4 dated Jul. 26, 2021.

* cited by examiner

*Primary Examiner* — Richard W Ridley
*Assistant Examiner* — Aimee Tran Nguyen
(74) *Attorney, Agent, or Firm* — Finch & Maloney PLLC

(57) ABSTRACT

A hydrodynamic torque converter (1) with a lock-up clutch (6) in a clutch space, (9) and with a piston (7) for activating of the lock-up clutch (6). The piston (7) separates the clutch space (9) from a piston chamber (10). The piston (7), via the application of pressure, can be moved, from a starting position in which the lock-up clutch (6) is disengaged, in the engaging direction of the lock-up clutch (6). The piston (7) has at least a closable opening (11) through which hydraulic fluid can flow from the piston chamber (10) into the clutch space (9). The opening (11) is open if either the piston (7) is away from the starting position and/or if a fluid pressure in the piston chamber (10), compared to the clutch space (9), is elevated. The closing element (12, 13) is tongue-shaped element which serves closing and opening of the opening (11).

10 Claims, 1 Drawing Sheet

HYDRODYNAMIC TORQUE CONVERTER WITH A LOCK-UP CLUTCH

This application claims priority from German patent application serial no. 10 2020 212 524.4 filed Oct. 5, 2020.

FIELD OF THE INVENTION

The invention concerns a hydrodynamic torque converter with a lock-up clutch.

BACKGROUND OF THE INVENTION

Hydrodynamic torque converters are clutches which work based on the Föttinger principle. Due to the almost wear-free functionality, they are applied in many technology areas for the transfer and/or transmission of rotation movements. Often, these torque converters have a converter transmission clutch, in short also called a lock-up clutch. When required, it serves to bypass, through a mechanical clutch, the generally hydrodynamic clutch of the converter. Thus, loss of flow in the converter can be minimized.

Hydrodynamic torque converters are applied in the automobile industry often as a wear-free start-up clutch and/or has an integrated transmission shift element. The torque converter, in particular, is here provided on the input side or as a central shift element of a multi-gear motor vehicle transmission. The torque converter is, therefore, torque-locked connected to the transmission. During the hydrodynamic operation of the torque converter, drive power is hereby transferred by means of a hydraulic fluid. It takes place almost wear-free, whereby mainly the hydraulic fluid accommodates the created heat loss. The torque converter is, therefore, often connected through a cooling system of the transmission and/or of the motor vehicle. Thermal energy is, in particular, created in the hydrodynamic torus of the converter and as friction power and the lock-up clutch.

A hydrodynamic torque converter with a lock-up clutch and a torsion damper is known through DE 10 2005 051 739 A1. The lock-up clutch shall demonstrate a constant conduct over a very large lifetime. Hereby, a direct cooling of the clutch disks of the lock-up clutch is proposed through an axial piston of the converter and the torsion damper. In an embodiment (FIG. 8), a check valve is applied. If hereby a pressure is present in the pressure room of an axial piston for the activation of the lock-up clutch, a flow of hydraulic fluid is, therefore, enabled. If, however, a smaller pressure is present in the pressure room than in the neighboring room, because the axial piston was just engaged or because it keeps the lock-up clutch disengaged, a flow of hydraulic fluid into the pressure room is hereby avoided.

Known through DE 10 2007 061 949 A1 is a clutch configuration with a clutch fixture and a clutch element and a pressing element. The pressing element can, in its engaged position, be brought into an operative connection and, in its disengaged positioned, be separated from the clutch element. A clutch enclosure is through the pressing element divided into at least two rooms, namely, into a pressing element pressure room and a clutch element cooling room. The pressing element pressure room has an engagement means of pressure hose and the clutch element cooling room as a pressure means supplied hose and a pressure means output hose. The pressing element has a pressure means passage between the pressing element partial room and the clutch element cooling room assigned to it, which becomes effective in the engagement position. Hereby, when the engagement pressure means supply hose is engaged, the pressure means supply hose is disconnected and, therefore, the pressure means passage represents a single pressure means supply access through the clutch element cooling room. However, during a disconnected engagement pressure means hose, the pressure means supply hose is connected.

SUMMARY OF THE INVENTION

The task of the present invention is to improve the state of technology. In particular, the torque converter shall be easily manufactured and provide a sufficient cooling of the lock-up clutch.

This task is solved through the activities which are listed in the main claim.

Derived preferred embodiments hereof can be retrieved from the dependent claims.

Thus, a hydrodynamic torque converter is proposed which has a lock-up clutch in a clutch space and a piston for the activation of the lock-up clutch. The piston hereby separates the clutch space from a piston chamber. The piston chamber has the purpose that the piston, when pressure is applied to the piston chamber, can be moved from a start position, at which the lock-up clutch is disengaged, towards the engagement direction of the lock-up clutch. Thus, the piston can be moved by adjustment of a fluid pressure in the piston chamber and, therefore, the lock-up clutch can be selectively activated in the disengagement sense or engagement sense. In particular, the piston chamber has hereby its own fluid supply means by which the hydraulic fluid can either be supplied or removed for activation of the lock-up clutch. An activating force is created for the piston, through the difference in pressure between the piston chamber and clutch space, which acts on the lock-up clutch and engages or disengages the lock-up clutch accordingly.

During a completely engaged lock-up clutch, the hydrodynamic power branch of the torque converter is bypassed, in regard to drive technique (deactivated), so that the torque at the input side is transferred through the lock-up clutch to the output of the converter. During a completely disengaged lock-up clutch, only the hydraulic dynamic power branch of the converter is activated whereby, seen in a pure hydrodynamic way, an input torque is transferred to the output. Through the use of a friction-type lock-up clutch, such as in particular a multidisc clutch, intermediate positions, between the completely disengaged and engaged clutch positions, can also be created, whereby the torque at the input side is partially transferred through the lock-up clutch and partially hydrodynamically to the output of the converter.

The piston of the converter has at least a lockable opening through which the hydraulic fluid can be brought from the piston chamber into the clutch space. Hereby, hydraulic fluid can be brought from the piston chamber into the clutch space for the cooling of the lock-up clutch. The opening is, in particular, designed as borehole.

The opening is open when the piston is located outside of the starting position. Alternatively or in addition, the opening is opened at the time when a fluid pressure in the piston chamber is (sufficiently) increased, meaning if a sufficient pressure drop exists from the pressure room towards the clutch space. Hereby, the hydraulic fluid from the piston chamber is only brought through the opening into the clutch space, for the cooling of the lock-up clutch, when the lock-up clutch is activated for the movement of the piston. Only is this condition that significant friction losses occur in the lock-up clutch, which make meaningful an increase of the flow of the hydraulic fluid towards the lock-up clutch.

It is now provided that the mentioned closing and opening of the opening takes place independently through a closing element. This closing element is designed as a tongue-shape. Hereby, it can be easily manufactured. In particular, the closing element is manufactured through forming technology like, in particular, through stamping. The closing element can be, therefore, a cost-effective sheet metal part. Thus, simple manufacturing of the torque converter is for one thing possible and provides, on the other hand, a sufficient cooling of the lock-up clutch.

The closing of the opening here takes place depending of the position of the piston and/or of the pressure difference between piston chamber and clutch space. A costly construction for the supply of the lock-up clutch with hydraulic fluid, depending on slippage, is not required.

For the closing of the opening, the closing element places itself at the piston. In the area of the opening, the closing element and the piston are, therefore, preferably of a complementarily designed so that a tight fit is created between the closing element and the piston. The closing element can be, therefore, designed in the area of the opening as concave or convex. The piston is designed, in this case, in the area of the opening as convex or concave, respectively.

A tongue-shape is hereby meant to be a longer, flat form-factor. The tongue-shape is preferably, viewed in the longitudinal direction, fixed at one end, in particular through a firm clamping, but where the opposite end is free. In particular, this free end of the tongue-shape is positioned in the area of the opening and serves to fit with the piston or close the opening. The free end of the tongue-shape, opposite to the fixed end of the tongue-shape, can be spring loaded to provide a certain preload when the opening is closed. Thus, the sealing effect of the closing element can increase. This suspension can be created through a design where the entire closing element, or at least a section of the closing element, is a leaf spring.

Preferably, the opening is a shutter type. Hereby, the loss of pressure in the piston chamber, caused by the opening, is kept within acceptable limits. The flowing hydraulic fluid, from the piston chamber through the opening into the clutch space, is constantly replaced through the fluid supply to the piston chamber. Thus, the set positioning of the piston in each case, and therefore the shift condition of the lock-up clutch, remain as is.

A first closing element can be provided for the opening which opens the opening at the time when the piston is located outside of the output position. A second closing element can also be provided for the opening which only opens the opening at that time when the fluid pressure in the piston chamber, compared for the clutch space, is increased. All of these closing elements can each operate individually with the respective opening, meaning in the sense of a logic OR-gate. The opening is, therefore, opened through the respective closing element if at least one of the both mentioned conditions are met. These two closing elements, however, can also operate cumulatively with the opening, meaning in the sense of a logic AND-gate. The opening is, therefore, opened through the closing elements only if both mentioned conditions are met. It is also possible that only the first closing element or only the second closing element is provided for the opening.

In particular, the first closing element is positioned in the piston chamber. Here, it can be designed in a way that it fits closely against the side of the piston which faces the piston chamber to close the opening. In particular, the second closing element is positioned in the clutch space. It can be designed in a way that it fits with the side of the piston which faces the clutch space to close the opening.

Preferably, several openings are provided in the piston. Hereby, the amount of hydraulic fluid which is brought into the piston chamber for the cooling of the lock-up clutch, can easily be increased. In particular, each closing element is individually provided and assigned to an opening. Therefore, there is a dedicated closing element for each opening which is assigned to just this particular opening. Further, each opening hereby can have an individual or there can be exactly two individual closing elements, namely the mentioned first and second closing elements.

Preferably, the torque converter has a housing which encloses at least the piston and the lock-up clutch. The closing element is hereby in particular fixed with the housing. The said first closing element is hereby meant, in particular. For instance, this closing element can be fixed at the housing or be designed as part of the housing. This closing element hereby is designed in a way so that it is positioned at the piston in its starting position, whereby it closes the opening. This closing element is designed in a way that it is outside of the starting position of the piston engines distant of the opening, whereby it opens the opening. Hereby, to open the opening, depending on the position of the piston, can easily be realized.

Preferably, the closing element is positioned at the piston. It is hereby in particular the said second closing element. This closing element is then designed in a way so that at least during an increased fluid pressure in the clutch space, in comparison with the piston chamber, it is placed at the piston, whereby it closes the opening. This placing can also take place when the same pressure conditions exist in the piston chamber and in the clutch space, for instance, through a preload at the closing element on the piston. This closing element is hereby designed in a way that during an increase fluid pressure in the piston chamber, compared to the clutch space, it is spaced from the piston, whereby it opens the opening. Hereby, opening of the opening, depending on the pressure difference between the piston chamber and the clutch space, can easily be realized.

Preferably, the opening is positioned radially inside with reference to the lock-up clutch. Hereby, the hydraulic fluid, flowing out of the opening into the clutch space during the operation of the torque converter—meaning when the torque converter rotates—is brought due to the centrifugal force radially outwards to and through the lock-up clutch. Thus, an especially effective cooling of the lock-up clutch is achieved.

Preferably the piston has an anti-twist protection. In particular, this anti-twist protection prevents relative rotation of the piston with reference to the housing of the torque converter. Therefore, the piston is torque-proof positioned at the housing. It is hereby ensured that the closing element is always correctly positioned towards the opening. The anti-twist protection is then especially suitable when the closing element is fixed with the housing and when for each opening an individual closing element is provided.

Preferably, the closing element redirects the inflow of the hydraulic fluid, coming from the opening into the clutch space, to the lock-up. The closing element is accordingly designed in a way that it changes the movement direction of the outflowing hydraulic fluid from the opening in the direction of the lock-up clutch. This is in particular realized through the tongue-shaped closing element which is positioned at the piston, that one end of the closing element is positioned radially inside with reference to the opening at the piston, and that the other free end of the housing element points radially toward the outside. The lock-up clutch is positioned in that direction.

Preferably, at least one spring element is provided which causes a preload between the closing element and the piston in the close condition of the opening. Hereby, the seal effect of the closing element is improved. The spring element is, in particular, positioned in a way that it presses on the piston in the direction of the closing element. For instance, the piston is hereby pushed in the direction of the starting position and onto the closing element fixed to the housing. During a movement of the lock-up clutch from the output position in the direction of the closing position, the spring element is then compressed. Hereby, an automatically resetting of the piston, into its starting position, is realized.

The closing element preferably forms a separate component of the torque converter. In this case, the closing element is mounted at another part of the torque converter, like in particular in the housing or the piston. Hereby, the closing element can easily be realized. The mounting takes place in particular through a stamping method or welding method. For instance, the closing element is pivoted or welded to it.

Alternatively, the closing element forms part of another component of the torque converter. The closing element is, therefore, an integral component of this other part, for instance of the piston or an housing part of the converter. For instance, the closing element is simultaneously manufactured with the other parts in a stamping method. Thus, there is no necessary manufacturing step for the installation of the closing element and the remaining torque converter.

If the lock-up clutch is designed as a multidisc clutch, the closing element is preferably part of the disk carrier of the lock-up clutch. The disk carrier carries the outer or inner disk of the lock-up clutch. This part is very well suitable to create the closing element. For one thing, it is created separately, in particular a cost-effective in a stamping method, but it is also in an immediate proximity to the lock-up clutch. For instance, the closing element can be a tongue of the disk carrier which sticks out radially inside from the other disks. The disk carrier can be an inner disk carrier or an outer disk carrier. In particular, it is that disk carrier which is fixed to the housing.

The torque converter also has, in particular, a pump wheel and a turbine wheel and a torsion damper. The pump wheel and the turbine wheel and the torsion damper are, in particular, positioned within the housing of the converter. The pump wheel is, in particular, designed as fixed to the housing. The pump wheel and the turbine wheel create a torus for the hydraulic fluid. The turbine wheel is rotatable with reference to the pump wheel. The torque converter can hydro-dynamically transfer torque from its input, by means of the hydraulic fluid, to its output. Depending on the design and the operating method of the converter, it is possible that it increases the output torque in reference to the torque at the input side, in particular through the use of an additional guide wheel. The torsion damper serves to damp the torsion oscillation between the input side and the output side of the torsion damper, as in particular the rotation uniformity of a combustion engine at the input. Thus, any torsion oscillation at the input is suppressed of not forwarded to the output side.

The housing of the converter has, in particular, a first housing part which encloses the blading of the pump wheel and which is mounted in it. In particular, this housing part is meant to be a rear (transmission side) housing half of the housing. The housing of the converter has, in particular, a second housing part which encloses the torsion damper and the lock-up clutch. This housing part is meant to be in particular a front (motor side) housing half of the housing. Thus, the housing is mainly constructed as two parts, in particular the said housing parts are fixedly connected with each other, for instance through welding, in an area.

Optional, a motor vehicle transmission is proposed which has a hydrodynamic torque converter. The transmission has a transmission input shaft. Herewith, drive torque is provided for the transmission. The output of the torque converter is hereby torque-proof connected with the transmission input shaft and, in particular, the converter is positioned on the transmission input shaft. The motor vehicle transmission can be a multi-gear transmission. The transmission has hereby a plurality of selectable gear ratios through which a present torque, at the input side, can be transposed towards the transmission output. In other words, the proposed hydrodynamic torque converter is preferably designed for the installation in a motor vehicle transmission.

BRIEF DESCRIPTION OF THE DRAWINGS

In the following, the invention is further explained based on the drawings through which additional, preferred embodiments of the invention can be seen. Hereby, schematic presentations show.

DETAILED DESCRIPTION OF THE PREFERRED EMBODIMENTS

Figure 1:
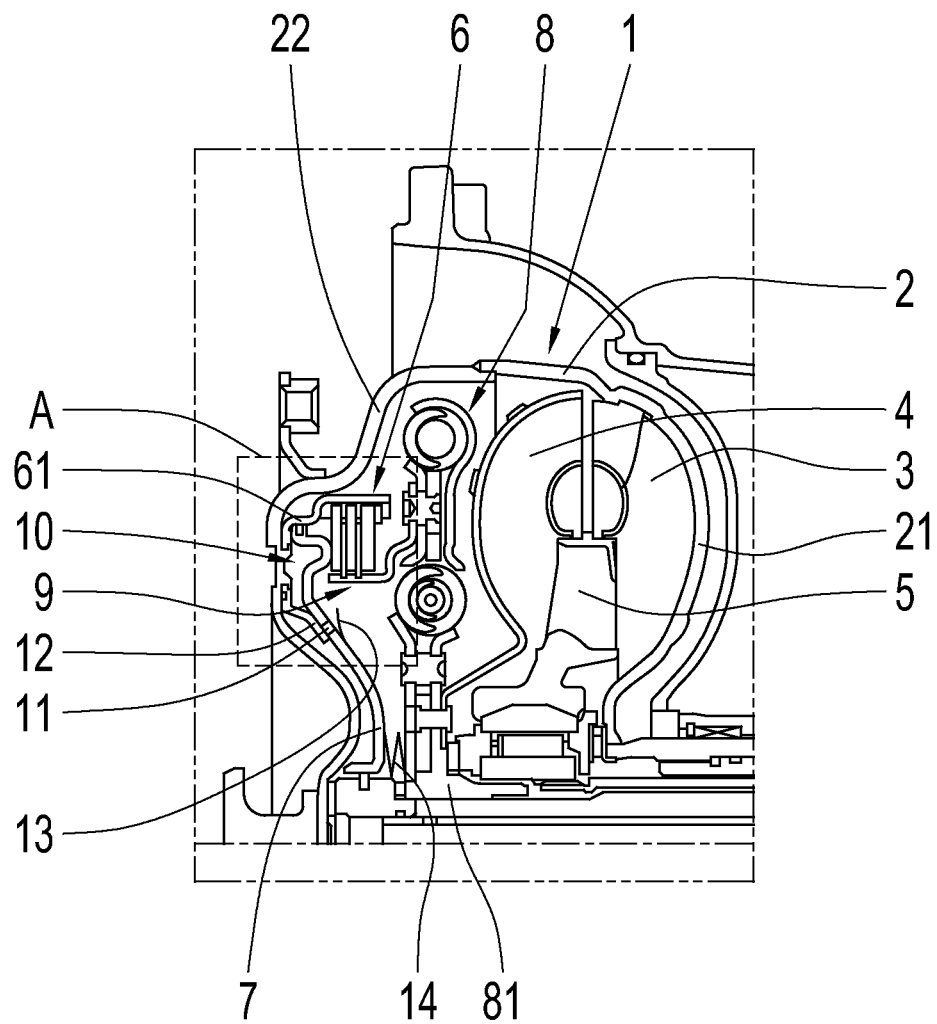
FIG. 1 a hydrodynamic torque converter.

For an easy overview, FIG. 1 only shows the upper half of the torque converter 1, the bottom part can have a mirror image design.

FIG. 1 shows the upper half of a longitudinal section cut through a hydrodynamic torque converter 1. The converter 1 is, as an example, positioned at the input side of a not further shown motor vehicle. The converter 1 has a generally known multi-part housing 2, a pump wheel 3, and a turbine wheel 4, as well as an optional stator 5. The pump wheel 3 is an integral part of the housing part 21, shown in FIG. 1 on the right (first/rear). A blading is positioned at this housing part 21 for the purpose. This housing part 21 can also be referred to as the pump part of the housing 2.

The pump wheel 3 and the turbine wheel 4 together create a torus, in which a hydraulic fluid circulates during the operation of the converter 1, so that a drive torque present at the housing 2 is hydrodynamically transferred through the pump wheel 3 to the turbine wheel 4. This principle is known as the Föttinger principle and, therefore, does not require any further explanation.

Within the housing part 22, shown in FIG. 1 on the left (second/front), a lock-up clutch 6 is provided. This one is designed as a friction-type multi-disc clutch. The lock-up clutch 6 can be activated, in the axial direction, via a hydraulic piston 7. This piston 7 is also positioned in the housing 22. A drive torque, which is present at the input side, can be transferred through the clutch 6 to the output of the converter 1, when bypassing the hydrodynamic power branch of the converter 1. Depending on the present contact pressure and the lamella discs of the clutch 6, a smaller or a larger amount of the drive torque, to be transferred by the clutch 6, is transferred to the output of the converter 1.

In a slipping operation of the clutch 6, as well as during the engagement or disengagement of the clutch 6, friction losses occur in the form of heat at the clutch 6. This heat is mostly disposed of by the hydraulic fluid which flows around the clutch 6 during the operation of the converter 1.

In addition, a torsion damper 8 is positioned within the housing part 22. The task of this damper 8 is to damp rotation uniformities of the drive torque at the input or to eliminate it, in particular during application of clutch 6. A hub 81 serves as output of the damper 8 and the converter 1. The hub 81 is torque-proof positioned on a transmission input shaft. The essential construction of such a damper 8 is also already known and does not need any further explanation.

The clutch 6 is positioned within a clutch space 9 of the converter 1. The piston 7 separates the clutch space 9 from the piston chamber 10. The piston chamber 10 can be acted upon with fluid pressure in that pressurized hydraulic fluid is directed into the piston chamber 10 in a targeted manner via a fluid supply opening. When the fluid pressure in the piston chamber 10 is increased sufficiently compared to the clutch space 9, the piston is moved from the starting position shown in FIGS. 1 and 2 in the closing direction of the clutch 6 (in FIG. 1 to the right in the direction of the torus). Hereby, the lamella discs are pressed against each other, therefore the clutch 6 engages. For a succeeding disengaging of the clutch 6, the fluid pressure in the piston chamber is accordingly lowered. The piston 7 moves back into its starting position. During the starting position, as shown in FIG. 1 and FIG. 2, the clutch 6 is completely disengaged.

As explained above, during the activation of the clutch 6, heat is introduced into the clutch 6. It can happen, during some load conditions of the converter 1, that a regular surrounding flow of the clutch 6 is too low to protect the clutch 6 from overheating. The piston 7 is, therefore, equipped with at least one opening 11, preferably with several such openings 11. The opening 11 connects the piston chamber 10 and the clutch space 9. Hydraulic fluid can flow through the opening 11 from the piston 10 into the clutch space 9. This hydraulic fluid serves for (additional) cooling of the clutch 6.

Figure 2:
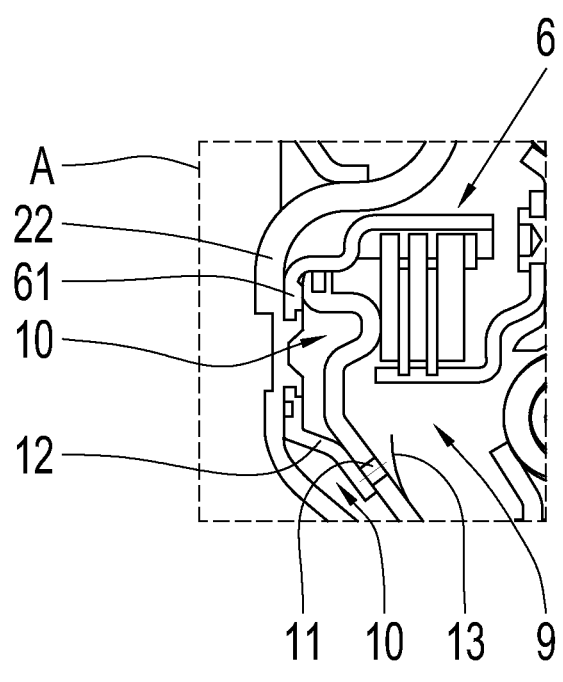
FIG. 2 an enlarged view of the torque converter as in FIG. 1.

The opening 11 is, as seen in FIG. 1 and FIG. 2, is preferably positioned radially inside of the clutch 6. The opening 11 can be, for instance, produced as a borehole in the piston 7. The opening 11 can be designed as shutters so to avoid an excessive pressure loss through it in the piston chamber 10.

At the time when a dynamic pressure arises in the clutch space 9, problems can occur with the opening 11. This dynamic pressure can, during a non-activated condition of the clutch 6, exceed the fluid pressure in the piston chamber 10. Hereby, unwanted hydraulic fluid from the clutch space 9 can penetrate through the opening 11 into the piston chamber 10. That can lead to an unwanted movement of the piston 7 and, therefore, to an unwanted activation of the clutch 6. Therefore, it is provided that the opening 11 can be automatically closed. The closing takes place when the piston 7 is in its starting position, where the clutch 6 is now disengaged and/or only when a low pressure drop exists between the piston chamber 10 and the clutch space 9. In that case, no frictional losses are to be expected in the clutch 6, and the clutch 6 then does not require any cooling. In other words, the opening 11 will only be opened if the piston 7 is present away from its starting position and/or the fluid pressure in the piston chamber 10 is sufficiently increased in comparison to the pressure within the clutch space 9. At this time, one can expect friction losses in the clutch 6 and cooling of the clutch 6 is appropriate.

The automatically closing of the opening 11 can take place through one or several closing elements 12, 13. An exemplary configuration of the closing elements 12, 13 can be seen in detail in FIG. 2. FIG. 2 shows enlarged the area A as indicated in FIG. 1. It shows here an exemplary embodiment with two closing elements 12, 13 for each opening 11. In other embodiments, only the closing element 12 or the closing element 13 can be provided for the opening 11. If more openings 11 are present, each of the openings 11 preferably has an individual closing element 12 and/or closing element 13. The closing elements 12, 13 have a tongue-shape design. Therefore, they can be simply manufactured.

The closing element 12 is installed at the housing 2 of the converter 1. It is positioned in the piston chamber 10 in a way that it fits in the starting position of the piston 7 with the side of piston 7 which is facing the piston chamber 10 and hereby reaches an overlapping of the opening 11. If the piston 7 is moved away from the starting position in the direction of clutch 6, it lifts itself from the closing element 12. Hereby, the closing element 12 automatically opens the opening 11—at least that particular end of the opening 11.

The surfaces of piston 7 and the closing element 12 which are in contact with each other are preferably designed as complementarity, for instance one surface is convex and the other surface is concave. A spring element 14 can be provided, see FIG. 1, to establish a preload in the starting position between closing element 12 and the piston 7, which improves the seal effect of the closing element 12. This spring element 14 pushes the piston 7 against the closing element 12. The spring element 14 also accomplishes that the piston 7 is always pushed in the direction of its starting position.

The closing element 12 represents, in the embodiment as in FIG. 1 and FIG. 2, a tongue-shaped extension of the disk carrier 61 of the clutch 6, pointing radially to the inside, here exemplary of the outer disk carrier 61. The closing element 12 is hereby also a part of the disk carrier 61. The disk carrier 61 is fixedly installed to the housing part 22. Therefore, also the closing element 12 is now fixed to the housing. The closing element 12 has a first end, which is used for fastening to the disk carrier 61 and thus to the housing 2, and a free second end, which is used to rest against the piston 7 in order to close the opening 11.

Preferably, a twist protection is provided at the piston 7, which prevents twisting of the piston 7 with reference to the closing element 12 which is fixed to the housing. The twist protection can be designed, for example, as a groove fixed to the housing or a projection fixed to the housing, along which the piston 7 is axially guided. Also, a guide rod, which is installed at the housing 2, can be provided for the piston 7.

However, the closing element 13 is fixed to the piston 7. It is designed as a separate part. It is designed so that it can fit to that side of the piston 7 which faces the clutch space 9 and hereby accomplishes overlapping with the opening 11 when a sufficient low pressure drop is present from the piston chamber 10 towards the clutch space 9, or if the pressure in the clutch space 9 is larger than in the piston chamber 10. If the fluid pressure in the piston chamber 10 is sufficiently increased, compared to the one in clutch space 9 and in particular to engage the clutch 6, the free end lifts itself off from the piston 7, due to the pressure difference. Thus, the closing element 13 opens the opening 11—at least that particular end of the opening 11.

Here, the surfaces of piston 7 and the closing element 13 which come into contact with each other are also designed as complementarity, for instance, one surface is convex and the other surface is concave. The sealing effect of a preload through closing element 13 on the piston 7 can itself be created through a spring effect of the closing element 13.

The closing element 13 represents, in the embodiment as in FIG. 1 and FIG. 2, a tongue-shaped membrane which points radially outward. The closing element 13 has a first end which serves for installation to the piston 7, to close the opening 11. The first end of the closing element 13 is, in particular, welded or pivoted to the piston 7. In the starting position of the closing element 13, the free end of the closing element 13 fits tight against the piston 7 and closes the opening 11.

FIG. 1 and FIG. 2 show a better view the closing element 13, in its open position, in which the free end of the closing element 13 is lifted away from the piston 7. The free second end of the closing element 13 resides radially inside while the first end, with which the closing element 13 is installed at the piston 7, resides radially to the outside. Hereby is accomplished that the inflowing hydraulic fluid, from the opening 11 into the clutch space 9, is diverted in the direction of clutch 6.

Through the shown serial configuration in FIG. 1 and FIG. 2 of the first and the second closing element 12, 13 at the opening 11, an interconnection arises for the closing elements 12, 13 in the sense of a logic AND gate. Thus, hydraulic fluid only flows from the piston chamber 10 through the opening 11 into the clutch space 9 and, therefore, towards the clutch 6, when the piston 7 is located outside of its starting position (closing element 12 opens) and when in addition the pressure in the piston chamber 10, compared to the clutch space 9, is sufficiently increased (closing element 13 opens). This is sufficient for the opening if the respective conditions for closing element 12, 13 are met. A parallel configuration of the first and second closing element 12, 13 is also possible, in particular where an opening 11 is provided for the first closing element 12 and if another opening 11 is provided for the second closing element 13. Hereby, an interconnection arises for the closing elements 12, 13 in the sense of an OR-gate.

Through the application of the tongue-shaped closing element 12, 13, the manufacturing of the converter 1 and, at the same time, the cooling of the clutch 6, especially during the slipping operation, is guaranteed. At the same time, the construction avoids a sophisticated, slipping dependent regulation of the hydraulic fluid which flows towards the clutch 6.

REFERENCE CHARACTERS

1 Hydrodynamic Torque Converter
2 Housing
21 Housing part
22 Housing part
3 Pump Wheel
4 Turbine Wheel
5 Stator
6 Converter Lock-up Clutch
61 Disk Carrier
7 Piston
8 Torsion Damper
81 Damper Hub
9 Clutch Space
10 Piston Chamber
11 Opening
12 Closing Element
13 Closing Element
14 Spring Element
A Area

The invention claimed is:

1. A hydrodynamic torque converter comprising:
a lock-up clutch being located in a clutch space with a piston for activating the lock-up clutch,
the piston separating the clutch space from a piston chamber,
the piston being movable away from a starting position, in which the lock-up clutch is disengaged, in a direction toward the lock-up clutch via application of pressure to the piston chamber,
the piston having at least one closable opening, through which hydraulic fluid can flow out of the piston chamber into the clutch space,
the at least one closable opening being open when at least one of:
the piston being located away from the starting position, or
fluid pressure in the piston chamber being greater than the clutch space,
at least one tongue shaped closing element cooperating with the at least one closable opening for independent closing and opening of the at least one closable opening, and
a housing encloses at least the piston and the lock-up clutch, and the at least one tongue shaped closing element is fixed to the housing,
in the starting position of the piston, the at least one tongue shaped closing element is closely fitted against the piston so as to close the at least one closable opening, and
the at least one tongue shaped closing element, when the piston is spaced away from the start position, permits the at least one closable opening to open.

2. The torque converter according to claim 1, whereby the at least one tongue shaped closing element is positioned on the piston,
the at least one tongue shaped closing element, during an increased fluid pressure in the clutch space in comparison to the piston chamber, is closely fitted against the piston so as to close the at least one closable opening, and
the at least one tongue shaped closing element, during an increased fluid pressure in the piston chamber in comparison to the clutch space, is spaced away the piston, whereby the at least one tongue shaped closing element opens the opening.

3. The torque converter according to claim 1, whereby the at least one closable opening is located radially inwardly relative to the lock-up clutch.

4. The torque converter according to claim 1, wherein the piston has an anti-twist mechanism.

5. The torque converter according to claim 1, wherein the at least one tongue shaped closing element is positioned so as to divert the hydraulic fluid, flowing from the at least one closable opening into the clutch space, toward the lock-up clutch.

6. The torque converter according to claim 1, wherein a spring element biases the piston into the starting position against the at least one tongue shaped closing element to close the at least one closable opening.

7. The torque converter according to claim 1, wherein the at least one tongue shaped closing element forms a separate part of the torque converter.

8. A hydrodynamic torque converter comprising:
a lock-up clutch being located in a clutch space with a piston for activating the lock-up clutch, the piston separating the clutch space from a piston chamber, the piston being movable away from a starting position, in which the lock-up clutch is disengaged, in a direction toward the lock-up clutch via application of pressure to the piston chamber, the piston having at least one closable opening, through which hydraulic fluid can flow out of the piston chamber into the clutch space, the at least one closable opening being open when at least one of:

the piston being located away from the starting position, or fluid pressure in the piston chamber being greater than the clutch space, at least one tongue shaped closing element cooperating with the at least one closable opening for independent closing and opening of the at least one closable opening, and the at least one tongue shaped closing element forms part of another component of the torque converter.

9. The torque converter according to claim 8, wherein the lock-up clutch is a multi-disk clutch and the at least one tongue shaped closing element is a part of a disk carrier of the lock-up clutch.

10. A hydrodynamic torque converter comprising:

a lock-up clutch being located in a clutch space with a piston for activating the lock-up clutch, the piston separating the clutch space from a piston chamber, the piston being movable away from a starting position, in which the lock-up clutch is disengaged, in a direction toward the lock-up clutch via application of pressure to the piston chamber, the piston having at least one closable opening, through which hydraulic fluid can flow out of the piston chamber into the clutch space, the at least one closable opening being open when at least one of:

the piston being located away from the starting position, or fluid pressure in the piston chamber being greater than the clutch space, at least one tongue shaped closing element cooperating with the at least one closable opening for independent closing and opening of the at least one closable opening, and the torque converter has at least first and second tongue shaped closing elements, and the first tongue shaped closing element closes a first side of the at least one closable opening and the second tongue shaped closing element closes a second side of the at least one closable opening.

\* \* \* \* \*